United States Patent [19]
Röhm

[11] Patent Number: 4,658,912
[45] Date of Patent: Apr. 21, 1987

[54] PERCUSSION DRILL

[76] Inventor: Günter H. Röhm, Heinrich-Röhm-Str. 50, 7927 Sontheim, Fed. Rep. of Germany

[21] Appl. No.: 726,587

[22] Filed: Apr. 23, 1985

[30] Foreign Application Priority Data

Apr. 27, 1984 [DE] Fed. Rep. of Germany ....... 3415654

[51] Int. Cl.⁴ ............................................. B25D 17/08
[52] U.S. Cl. .................................. 173/104; 279/19.4; 279/62
[58] Field of Search ........................ 279/19, 62, 60, 61, 279/63–65, 19.6, 19.7, 19.4; 173/104

[56] References Cited

U.S. PATENT DOCUMENTS 1,731,836 10/1929 Williams ........................... 279/19 X
2,608,180 8/1952 Curtis ................................ 279/19 X
3,010,730 11/1961 Fuehrer ................................ 279/19

FOREIGN PATENT DOCUMENTS 3132449 7/1983 Fed. Rep. of Germany .
2030485 4/1980 United Kingdom .................. 279/19

Primary Examiner—James M. Meister
Assistant Examiner—John L. Knoble
Attorney, Agent, or Firm—Karl F. Ross; Herbert Dubno

[57] ABSTRACT

A percussion drill has a percussion drill spindle and a drill chuck member which is turned and axially driven by the spindle. The drill chuck member has an axial passage through which the respective percussion action can be transferred from the spindle to that end of the drill which is held between centrically movable and adjustable chuck jaws. The drill chuck member can be axially moved on the percussion drill spindle, and the distance of movement can be limited in the forward direction towards the drill by an abutment. The abutment is formed, on the one hand, by an annular collar which is arranged at the percussion drill spindle and, on the other hand, by an annular shoulder member which surrounds the percussion drill spindle and which is formed in the chuck body. The collar and the shoulder member have opposing surfaces which provide large contact areas during impact or operational strokes.

4 Claims, 3 Drawing Figures

PERCUSSION DRILL

FIELD OF THE INVENTION

My present invention relates to a percussion drill and, more particularly, to a percussion drill which has a percussion drill spindle (coupled to a motor provided with means for rotating and imparting axial displacement to the spindle) and a drill chuck which is rotated and axially driven by the spindle.

BACKGROUND OF THE INVENTION

A drill chuck of a rotary impact drill can have an axial passage through which the respective percussion action can be transferred from the spindle to an end of the drill which is held between centrically movable and adjustable chuck jaws. The axial stroke or movement can be limited by an abutment which is arranged between the percussion drill spindle and the drill chuck.

A percussion drill apparatus has been described in German Patent Publication DOS No. 3,132,449 which was laid open on July 21, 1983. In this known percussion drill apparatus, the percussion drill spindle has a transverse recess which serves to receive a transverse pin which is fixed in the chuck body. The transverse recess dimension is somewhat greater than the thickness or diameter of the transverse pin, and the connection achieved by the pin prevents rotation of the respective elements which are not to be rotated. Provisions are, nevertheless, made that the spindle has a predetermined free and axial play, which play or clearance is necessary to transmit the percussion action to the drill which is held in the drill chuck.

As long as the percussion drill action is in reaction to a sufficiently large drill reaction or resistance at the drilling location, the path or distance (stroke) of the percussion movement, as well as that of the percussion spindle, is generally smaller than that which is feasible due to the free axial tolerance defined by the transverse connecting pin. In the absence of a resistance, or in the presence of a low resistance to the drill action, the percussion stroke can be larger. In such an event, a considerable portion of the percussion energy is transferred directly from the percussion drill spindle to the drill chuck, whereby the percussion drill spindle impacts with the radial ends of its transverse passages on the transverse connecting pin. The surface areas which are contacted in such action are rather small, and high specific loads per unit area are experienced. This may lead to lasting deformations of the percussion drill spindle and/or the transverse connecting pin. In the long run, this can damage the drill chuck or spindle.

OBJECTS OF THE INVENTION

It is therefore the principal object of my present invention to provide an improved percussion drill which substantially precludes the aforedescribed disadvantages.

It is also an object of the invention to provide an improved percussion drill which substantially avoids excessive wear of the drill chuck and the percussion drill spindle.

It is furthermore an object of the invention to provide a percussion drill with large contact surfaces on which the specific surface loads remain sufficiently small so that permanent deformations of contacting surfaces and other effects and/or damage of the drill chuck are safely prevented.

It is also an object of my invention to provide an improved percussion drill in which the percussion drill spindle can easily move relative to the chuck in a reciprocating manner, but with positive limitation of the axial movements.

SUMMARY OF THE INVENTION

These objects are attained in accordance with the invention in that an abutment is formed by a stop means which includes, on the one hand, an annular radially outwardly extending shoulder which is provided on the percussion drill spindle and, on the other hand, an annular radially inwardly extending shoulder member or element which surrounds the percussion drill spindle and which is formed in the chuck body and axially confronts the shoulder of the spindle. On impact during operation, the shoulder elements contact one another with their large contact surfaces perpendicular to the chuck and spindle axes.

Accordingly, the contacting surfaces can be selected to be so large that even under heavy impact or utilization (service) of the drill chuck by the percussion drill spindle, the specific surface loads remain sufficiently small so that permanent deformations at the contacting surfaces, other effects, and/or damage of the drill chuck are safely prevented.

A further abutment surface is advantageously formed by the outwardly extending shoulder on its rearward side. In an opposite manner with respect to this further surface there is provided a disc or washer which is held in the chuck body. The disc and the rearward side or surface of the annular spindle shoulder present an abutment or stop means for limiting the distance traversed by the drill chuck on the percussion drill spindle in the direction away from the drill.

The disc can be held in place by a spring washer which is mounted in an annular groove of the chuck body. Such mounting will be fully adequate for retaining the drill chuck on the percussion drill spindle. This is feasible, moreover, because the impact effects of the drill chuck caused by the percussion drill spindle are significantly less in the rearward direction, i.e. in the direction away from the drill, than in the forward direction, i.e. the direction towards the drill.

The result is that the axial movements of the drill chuck on the percussion drill spindle can independently adjust themselves, as it were, in an interrelated manner. The interrelationship is afforded by two stops or abutments. The impact effects on the surfaces which contact one another during impact are, respectively, a function of the size of these surfaces and of the magnitude of the free axial clearance, or distance which can be traversed by the drill chuck on the percussion drill spindle. In other words, the distance of axial travel of the drill chuck is primarily limited by the abutments, stops, or stop means. These impact effects will be smaller when the distance between the abutments is greater.

BRIEF DESCRIPTION OF THE DRAWING

The above and other objects, features and advantages of my invention will become more readily apparent from the following description, reference being made to the accompanying drawing, in which.

SPECIFIC DESCRIPTION

The percussion drill apparatus has a drill spindle 1 and a drill chuck 2. The drill chuck 2 is driven by the spindle 1 which, in turn, is mounted so as to rotate to impact in the percussion cycle or operation. Such spindles and their drives are well known in the art and need not be further particularized.

Figure 3:
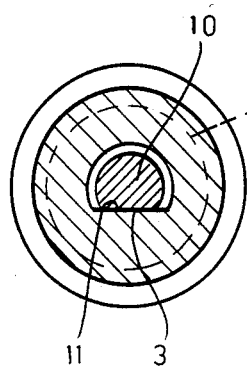
FIG. 3 is a section along line III-III of FIG. 1.
Figure 1:
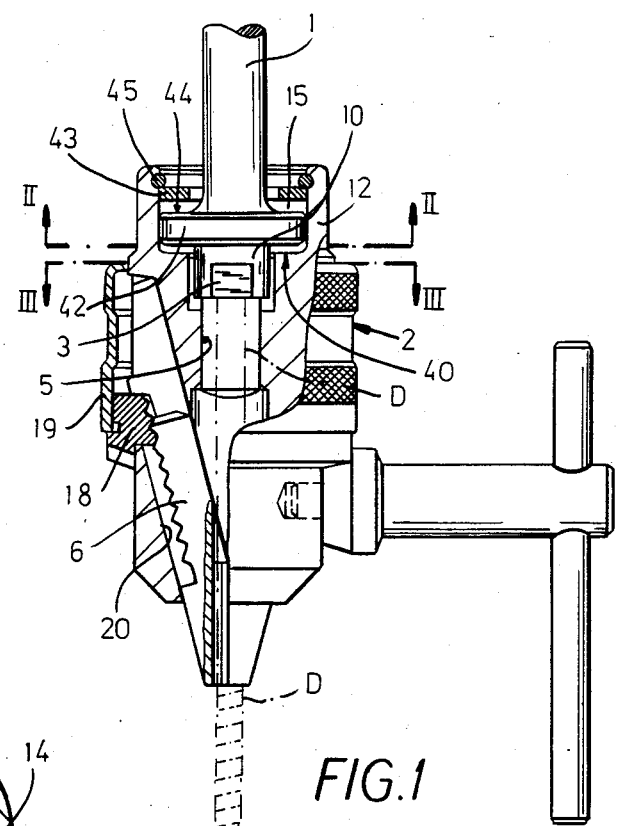
FIG. 1 is a longitudinal axial cross section through a percussion drill.
Figure 2:
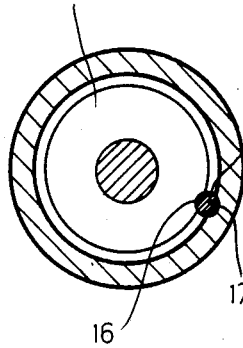
FIG. 2 is a section along line II—II of FIG. 1 illustrating a modification.

The percussion drill spindle 1 is provided with planar surfaces 3 on a boss 10 of the spindle which cooperate with a corresponding planar surface 11 on the chuck body 12 of the drill chuck 2 for imparting rotary movement to the drill chuck 2 while permitting axial displacement. Instead (see FIG. 2) another keying arrangement can be provided.

The connection between the drill chuck 2 and the percussion drill spindle 1 is such that the drill chuck 2 carries out the respective motion of the percussion drill spindle 1. The alternative rotational connection between the drill chuck 2 to the drill spindle 1 can be effected for example by an axial pin 14, arranged in grooves 16 and 17 of the spindle 1 and the chuck body 12, respectively. Such grooves are arranged in a juxtaposed manner so as to prevent relative movement of the drill chuck member 2 and the percussion drill spindle 1 with respect to one another, while not impairing axially directed relative movements.

The drill chuck 2 is furnished with an axial passage 5, and the percussion movement of the drill spindle 1 is transferred to the drill D. More specifically, the percussion movement is transferred to that end of the drill D which is secured between a plurality of radially and centrically adjustable chuck jaws 6. The means for advancing and retracting the chuck jaws 6 includes a threaded ring 18 rotatable by a knurled sleeve 19 and whose threads engage those of the jaws 6 which are slidable in guideways 20 of the chuck body.

The axial distance of movement of the drill chuck 2 on the spindle 1 in the forward direction, i.e. the direction towards drill D, is limited by anabutment or stop means which is positioned between the spindle 1 and the drill chuck 2. This abutment or stop means is formed, on the one hand, by an annular formation 42 in the form of a radially outwardly extending shoulder on the spindle 1, while with respect to the drill chuck 2, this stop is formed by an annular inwardly extending shoulder, or similar formation 40, which is arranged in the chuck body 12 and which surrounds the spindle 1.

The spindle shoulder 42 and the annular chuck shoulder 40 can contact one another at the completion of the respective stroke. Accordingly, the confronting planar surfaces of the shoulders perpendicular to the axis of the chuck are dimensioned such that even under the roughest impact or stroke utilization of the drill chuck 2, the specific surface loadings at the abutment surfaces are held sufficiently small, and no permanent deformations or damage can occur at the drill chuck 2, or at the percussion drill spindle 1.

The shoulder 42 has a further annular surface 44 and this is directed towards a disc or washer 43 which is secured in the chuck body 12. The disc 43 is held by a split spring washer 45 which is lodged in an annular groove. The annular groove, the shoulder 42, and the other respective elements of the apparatus are arranged in the generally cylindrical and hollow space or recess 15 in the chuck body 12. The disc 43, in conjunction with the surface 44 of the shoulder 42, also provides a stop or abutment assembly to limit the movement distance of the drill chuck 2 on the spindle 1, in the direction away from the drill D.

The drill chuck 2 is free to travel to and fro in axial directions on the spindle. The movement is limited, on the one hand, by the annular shoulder 40 and, on the other hand, by the respective side or surface of the disc 43 The drill chuck member 2 is arranged with play or clearance on the drill spindle 1 to allow such axial freedom. For normal operation, this axial freedom should be designed in such a way that the shoulder 42 of the spindle 1 does not contact the shoulder 40 of the drill chuck 2 during every, or almost nearly every, percussion lift or stroke.

I claim:

1. In a rotary percussion drill, the combination which comprises:

a percussion drill spindle capable of axial reciprocation and rotation;

a drill chuck body mounted on said percussion drill spindle and engaged thereby for rotation and axial impact movement by said precussion drill spindle but movable axially relative to said spindle, said chuck body being formed with an axial passage through which percussion action can be transferred from said precussion drill spindle to a drill;

a plurality of chuck jaws on said drill chuck body movable to secure said drill on said body;

a radially outwardly extending annular shoulder formed on said percussion drill spindle and having a circumferentially continuous abutment surface in a plane perpendicular to an axis of said spindle and said body turned toward said drill;

a radially inwardly extending circumferentially continuous annular shoulder formed on said chuck body and having an abutment surface in a plane perpendicular to said axis juxtaposed with said abutment surface of said spindle, said surfaces providing large annular contact areas during contact against one another;

means limiting axial movement of said drill chuck body in a direction away from the drill, said means comprising:

a circumferentially continuous rearwardly facing surface in a plane perpendicular to said axis on the shoulder of said spindle, a disc connected to said chuck body, said disc having a circumferentially continuous contact surface in a plane perpendicular to said axis juxtaposed with said rearwardly facing surface, and means for retaining said disc on said body.

2. The percussion drill apparatus according to claim 1 wherein said percussion drill spindle and said drill chuck body have complementary planar surfaces adapted to engage one another for rotational entrainment of said drill chuck body by said percussion drill spindle.

3. The percussion drill apparatus according to claim 1 wherein said shoulder of said spindle is integrally formed with said percussion drill spindle.

4. The percussion drill apparatus according to claim 1 wherein said retaining means is a spring ring received in an annular groove in said chuck body.

* * * * *